United States Patent [19]
Hineman

[11] Patent Number: 5,290,034
[45] Date of Patent: Mar. 1, 1994

[54] GAME CHAIR APPARATUS

[76] Inventor: Derral Hineman, 4015 N. 78th St., Scottsdale, Ariz. 85251

[21] Appl. No.: 9,921

[22] Filed: Jan. 15, 1993

[51] Int. Cl.⁵ ...................... H63B 71/04; A63F 9/22; G09B 9/02
[52] U.S. Cl. ............... 273/148 B; 273/438; 273/313; 434/29
[58] Field of Search ................. 273/148 B, 438, 85 G, 273/313, 316; 297/463; 434/29, 45, 62; 272/73, 97, 129

[56] References Cited
U.S. PATENT DOCUMENTS

| | | | |
|---|---|---|---|
| 4,461,470 | 7/1984 | Astroth et al. | 273/85 G X |
| 4,630,817 | 12/1986 | Buckley | 273/438 X |
| 4,817,950 | 4/1989 | Goo | 273/438 |
| 5,054,771 | 10/1991 | Mansfield | 273/438 X |
| 5,195,746 | 3/1993 | Boyd et al. | 273/438 X |

OTHER PUBLICATIONS
Power 10 Hotseat "Playthings" Magazine, Dec. 1990, p. 39.

Primary Examiner—Harrison, Jessica J.
Assistant Examiner—Raleigh W. Chiu
Attorney, Agent, or Firm—H. Gordon Shields

[57] ABSTRACT

Game chair apparatus includes a seat which is adjustable height wise for accommodating users of different sizes. The chair apparatus includes a movable plate to which is secured a joy stick and which is movable by the user of the seat to provide multiple outputs in response to the mechanical movement of the joy stick. In addition, the joy stick includes trigger elements for providing desired output signals for playing electronic games to which the chair apparatus may be connected.

14 Claims, 3 Drawing Sheets

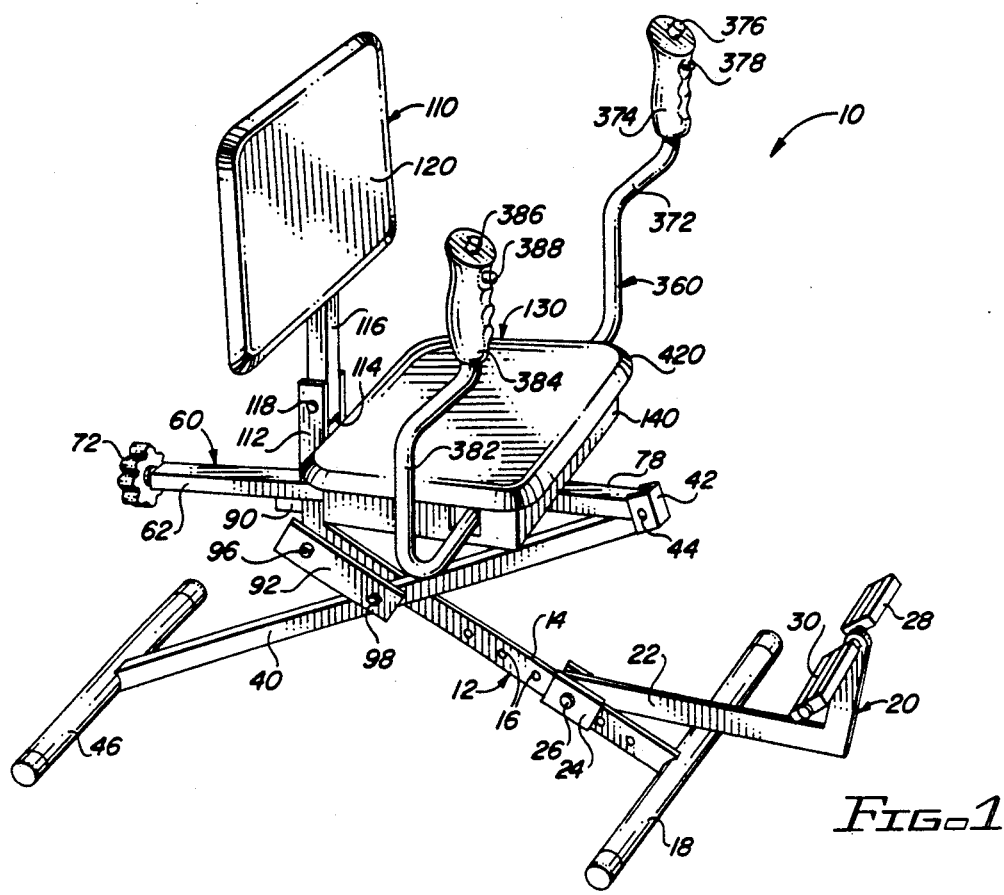

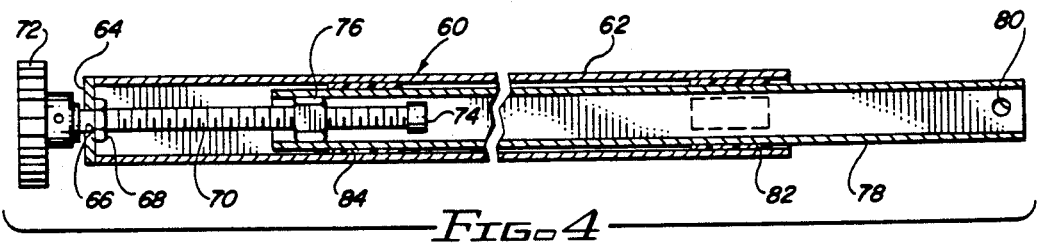
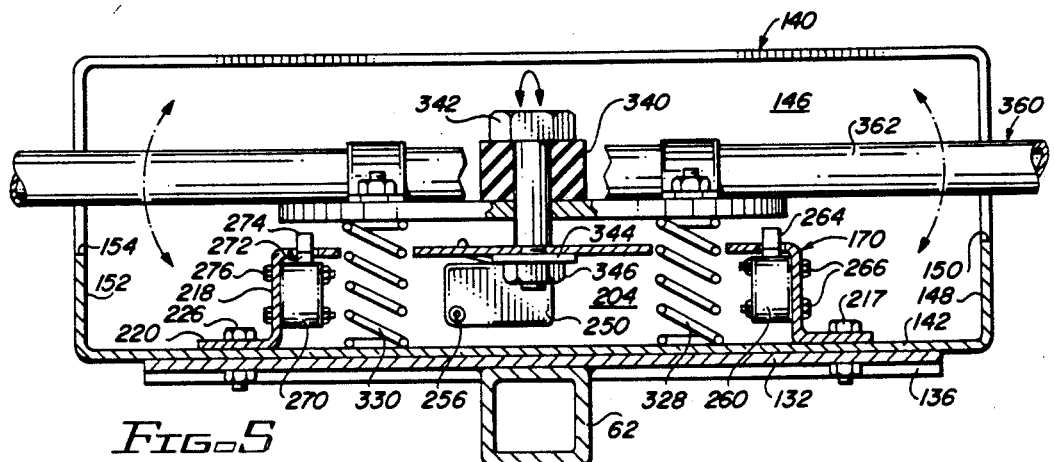
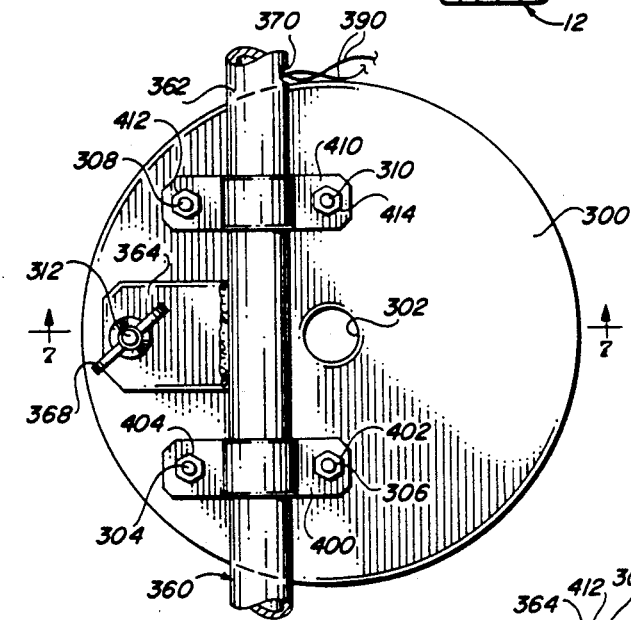
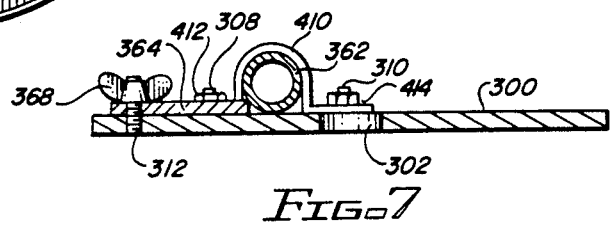

GAME CHAIR APPARATUS

BACKGROUND OF THE INVENTION

1. Field of the Invention

This invention relates to chair apparatus and, more particularly, to chair apparatus usable for playing games which require movement of portions of the chair.

2. Description of the Prior Art

U.S. Pat. No. 113,342 (Postavka) discloses an adjustable seat with a screw threaded shaft adjusting the height of the seat. The legs of the seat are in a sort of an x configuration, and adjusting the screw varies the height of the seat by adjusting the distance between the legs. That is, the angle between the legs in the x configuration is increased or decreased to adjust the height of the seat.

U.S. Pat. No. 3,077,038 (Williams et al) discloses a fixed chair secured to a console with a built in television or other type of monitoring system. The apparatus is designed for instructional purposes.

U.S. Pat. No. 3,623,766 (Funk) discloses a chair apparatus in which a seat is secured to two members that are in turn pivotly secured together. There are different elements that are also secured to the two leg members. The apparatus is identified as a chair usable be a fisherman, and included among the elements secured to the two members are holders for the handle end of a fishing rod.

U.S. Pat. No. 4,015,778 (Chen et al) discloses a folding chair in which legs are secured together and are relatively adjustable. The legs are made of members which have the "x" configuration or relationship and the members may be folded as desired, for storage and transportation.

U.S. Pat. No. 4,917,341 (Pirchio) discloses a pair of members pivotly secured together for supporting a musical keyboard. Again, the "x" configuration is used for the two members, with the members being secured together and the spreading apart of the members varies the height at which the keyboard may be disposed.

U.S. Pat. No. 4,925,240 (Peters) discloses a chair system which comprises a personal computer desk. Different elements are involved, but the basic chair is a fixed chair, with a desk top secured to the chair for supporting a personal computer.

U.S. Pat. No. 5,056,864 (Cooper) discloses a chair combined with a video display terminal and a keyboard, again, for a personal computer. The chair is pivotable or adjustable, and the video display terminal and the keyboard are similarly adjustable. There is a fixed base, and the various elements are adjustable relative to the base and to each other for the comfort or convenience of the user of the apparatus. The apparatus is defined as a computer work station system.

As will be understood, the prior art chair apparatus discussed above utilized various elements in connection with chairs of some type or supports of some type in which various elements are adjustable relative to either apparatus to be supported or to various elements which are involved in the system itself. The apparatus of the present invention provides chair apparatus which is usable for a different purpose from any of the purposes for which the above described apparatus have been designed. Accordingly, there are structural differences which allow the apparatus to carry out their purpose for which it was designed.

SUMMARY OF THE INVENTION

The invention described and claimed herein comprises a chair apparatus in which the seat is adjustable vertically to accommodate players of different sizes. Beneath the seat is a plate that is movable relative to a fixed base for providing desired output signals for electronic elements secured to the apparatus. The movable plate is controlled by a two handled joy stick. Trigger elements or switches are included in the joy stick. The user of the chair apparatus accordingly is able to provide multiple output signals by a movement of the joy stick resulting from arm movements and by the triggers through finger movements.

Among the objects of the present invention are the following:

To provide new and useful chair apparatus;

To provide new and useful chair apparatus usable in the playing of games;

To provide new and useful chair apparatus having a variable height for user;

To provide new and useful chair apparatus in which a seat is movable relative to a fixed base;

To provide new and useful chair apparatus having a two handled joy stick movable relative to a fixed base; and To provide new and useful chair apparatus having a multiple output system responsive to movements of mechanical elements operated by a user.

BRIEF DESCRIPTION OF THE DRAWINGS

FIG. 1 is a perspective view of the apparatus of the present invention.

FIG. 2 is a side view of the apparatus of the present invention.

FIG. 4 is a view in partial section of a portion of the apparatus of the present invention.

FIG. 5 is a view in partial section of another portion of the apparatus of the present invention.

FIG. 6 is a top view of another portion of the apparatus of the present invention.

FIG. 7 is a view in partial section taken generally along line 7—7 of FIG. 6.

DESCRIPTION OF THE PREFERRED EMBODIMENT

Figure 3:
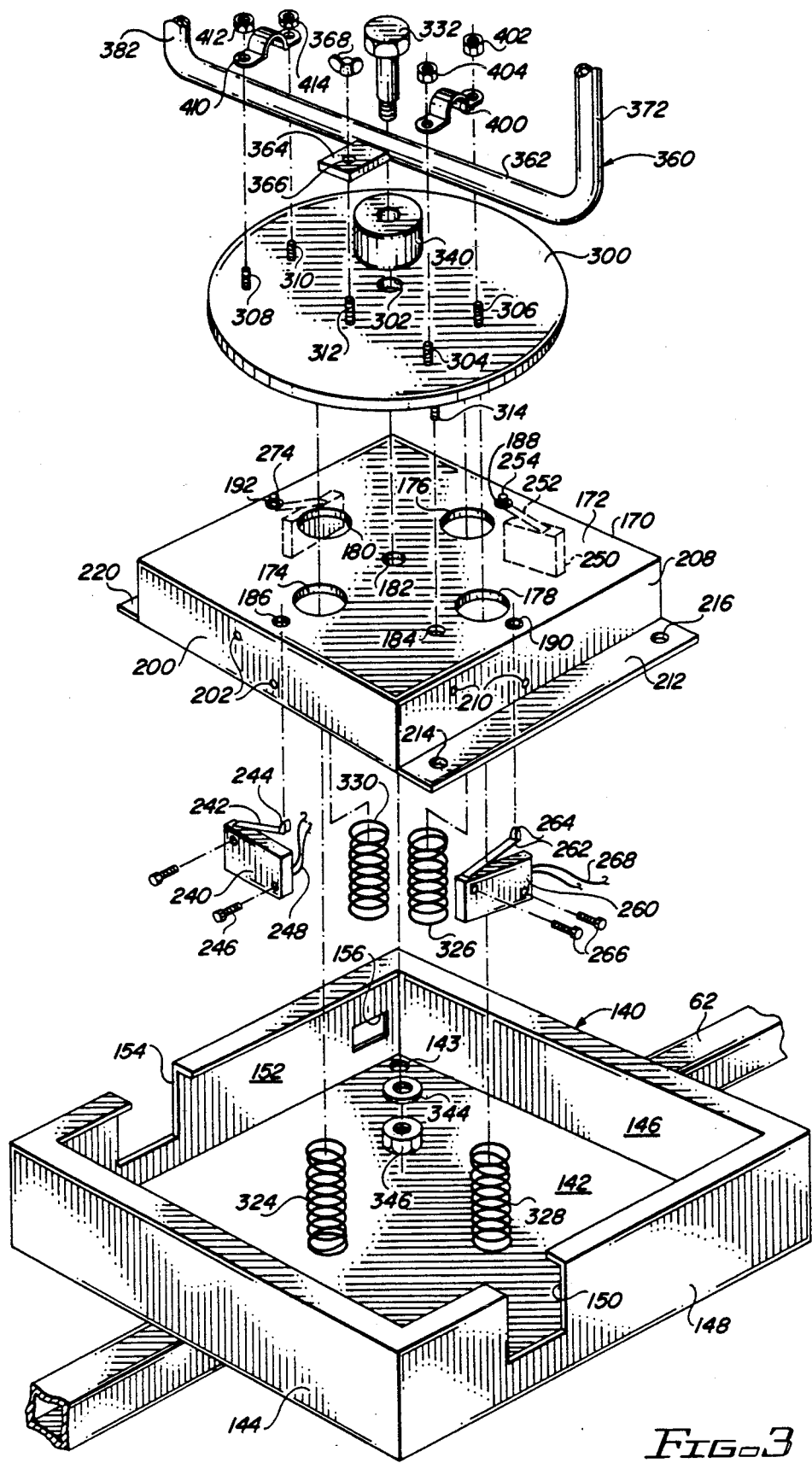
FIG. 3 is an exploded perspective view of a portion of the apparatus of the present invention.

FIG. 1 is a perspective view of game chair apparatus 10 of the present invention. FIG. 2 is a side view in partial section of the chair apparatus 10. For the following discussion, reference will primarily be made to FIGS. 1 and 2.

The chair apparatus 10 includes a base 12 which includes generally 3 primary elements appropriately secured together. There is a front member 14 which preferably comprises a length of rectangular tubing and to which is secured a transversely extending front stabilizer 18. Along the length of the member 14 extending rearwardly from the front stabilizer 18 is a plurality of apertures 16. The purpose of the apertures 16 is to enable a foot rest 20 to be secured to the member 14 at various locations, as desired.

The foot rest 20 comprises a generally L shaped member 22, with the long arm of the member 22 secured to the member 14 through a bracket 24 and a screw 26. The short arm of the member 22 supports a pair of foot pedals or foot rests 28 and 30. The foot rests or pedals 28 and 30 extend generally perpendicularly outwardly from the short arm of the member 22.

If desired, the foot rests or pedals 28 and 30 may include switches or other sensors which provide an output signal in response to movement of the pedals or foot rests.

The bracket 24 is simply a generally U shaped bracket which includes a pair of aligned holes. The holes in the bracket 24 are aligned with a hole in the end of the long arm of the member 22 and with one of the holes 16 in the member 14 for securing the foot rest 20 to the member 14.

The base 12 also includes a rear member 40 which is also preferably made of rectangular tubing. The member 40 includes a front cap 42 and a rear stabilizer 46. The rear stabilizer 46 is generally parallel to the stabilizer 18 of the front member 14. The cap 42 is at the front or upper end of the member 40, remote from the rear stabilizer 46. The stabilizers 18 and 46 are generally parallel to each other and provide lateral stability for the chair apparatus 10.

The front cap 42 comprises a generally U shaped member preferably secured, as by welding, to the end of the member 40. The front cap 42 extends upwardly from the member 40 to allow the member 40 to be secured to a horizontal assembly 60. For such securement, the end cap 42 includes a pair of aligned apertures which receive an appropriate fastening element, such as a pin or bolt 44, to secure the member 40 to the horizontal assembly 60, as will be discussed below.

The horizontal assembly 60 is the third major portion of the base 12. The horizontal assembly 60 is shown in partial section in FIG. 4. For the following discussion of the horizontal assembly 60, reference will be made to FIG. 4 in addition to FIGS. 1 and 2.

The horizontal assembly 60 includes an outer tube or sleeve 62 and an inner tube 78. The outer tube or sleeve 62 includes an end plate 64. The tube or sleeve 62 is preferably square tubing, as also shown in FIG. 5. The end plate 64 covers one end of the tube 62. The opposite end of the tube 62 is open and the inner tube or member 78 extends into the outer tube 62 through the open end.

An aperture 66 extends through the end plate 64 and a bushing 68 is appropriately secured, as by welding, about the aperture 66 on the inside of the end plate 64 and thus on the inside of the tube 62.

A threaded rod 70 extends through the aperture 66 and through the bushing 68. A handle 72 is secured to the "outer" end of the threaded rod 70, outside of and adjacent to the end plate 64, and a stop element 74 is secured to the "inner" end of the threaded rod 70, disposed within the tubes 62 and 78.

The threaded rod 70 extends through a nut 76 which is appropriately secured, as by welding, to the inner tube 78 and adjacent to the end of the tube 78 within the outer tube 62. The tube 78 includes a pair of aligned apertures 80 adjacent to the "outer" end of the tube 78, outside of the tube 62 and remote from the nut 76 at the "inner" end of the tube 78.

As may be understood from FIGS. 1 and 2, the outer end of the tube 78 extends into the cap 42 of the member 40. The pin or bolt 44 extends through the pair of apertures in the front cap 42 and through the aligned apertures 80 to secure the tube 78, and accordingly the horizontal assembly 60, to the member 40.

In FIG. 4, a pair of bearing assemblies 82 and 84 are shown between the inner tube 78 and the outer tube 62. The inner tube 78 moves relative to the outer tube 62 on the bearing assemblies 82 and 84.

From FIG. 4, it will be understood how rotation of the handle 72, which is fixed to the threaded rod or shaft 70, causes movement of the inner tube 78 relative to the outer tube 72. With the threaded rod or shaft 70 extending through a nut 76 in the tube 78, and with the nut 76 being fixed to the tube 78, rotation of the handle 72 causes rotation of the shaft 70, and the nut 76 moves on the shaft 70 and the movement of the nut 76 in turn imparts movement to the tube 78.

Returning again to FIGS. 1 and 2, the relationship among the three elements of the base 12, namely the front member 14, the rear member 40, and the horizontal assembly 60, may be understood.

A bracket 90 is appropriately secured, as by welding, to the bottom of the outer tubing or sleeve 62. The bracket 90 includes an appropriate bushing through which a pin or bolt 96 extends to secure the member 14 to the outer tube or sleeve 62 of the horizontal assembly 60.

Both the member 14 and the member 40 include a pair of holes or apertures between their respective ends, but not necessarily at their mid points, through which a pin or bolt 98 extends. The aligned apertures in the members 14 and 40 through which the pin or bolt 98 extends secures the members 14 and 40 together for relative motion.

A plate 92 extends generally parallel to the upper portion of the member 40 between the bracket 90 and the member 40. The plate 92 includes a pair of holes or apertures which are appropriately aligned with apertures in the members 14 and 40 through which the pin bolt 98 extends and with the bushing in the bracket 90 and the aperture in the member 14 through which the pin or bolt 96 extends. The plate 92 and the upper portion of the member 14 are thus in parallel from the bracket 90 to the member 40 for providing an appropriate stabilizing effect for the member 14 relative to the members 62 and 40.

The members 14, 40 and 60, are thus pivotly linked together. By varying the length of the horizontal assembly 60, the distance between the front stabilizer 18 and the rear stabilizer 46 may be varied. The height of the horizontal assembly 60 is accordingly varied.

In other words, as the length of the horizontal assembly 60 is increased by movement of the tube 78 relative to the tube 62, the height of the horizontal assembly 60 relative to the stabilizers 18 and 46 decreases. Shortening the length of the horizontal assembly 60 by the same relative movement decreases the distance between the stabilizer members 18 and 46 and thus increases the height of the horizontal assembly.

The front member 14 and the rear member 40 and the horizontal assembly 60 are secured together essentially is a scissors type arrangement. The members 14 and 40 are the scissors elements or struts and the horizontal assembly 60 causes the scissors struts to move relative to each other to vary the height of the horizontal assembly 60 relative to a surface on which the chair apparatus 10 is disposed on for the benefit and comfort of a user. The base 12 may also be essentially collapsed for storage and transport by thw scissors strut arrangement as may be understood.

A chair or seat back assembly 110 is secured to the horizontal assembly 60, and specifically to the outer tube or sleeve 62 thereof. The chair back assembly 110 is best shown in FIGS. 1 and 2.

The chair back assembly 110 includes a channel bracket 112 which extends upwardly from and is appropriately secured to, as by welding, the top of the sleeve or tube 62. The bracket 112 includes a slot 114 which extends downwardly from the upper part of the bracket 112. A vertical support member 116 is appropriately pinned to the upper portion of the bracket 112 by a pin or bolt 118. A cushion or chair back 120 is appropriately secured to the upper portion of the vertical support member 116.

The channel bracket 112 is a generally U shaped element, having a pair of arms and a center web connected to and extending between the pair of arms. The arms are connected to the tubing of the member 62. The slot 114 in the center web of the bracket 112 allows the vertical support member 116 and the seat back or back cushion 120 secured to it to pivot relative to the bracket 112 in a forward pivoting movement. This allows the cushion 120 to be disposed generally parallel to the horizontal assembly 60, and disposed on top of a seat assembly 130. The seat assembly 130 will be discussed in more detail below.

When the vertical support member 116 is pivoted to the "up" or use position shown in FIGS. 1 and 2, the portion of the center web of the bracket 112 below the slot 114 acts as a stop element to limit the movement of the vertical support member 116.

The seat assembly 130 is shown in FIGS. 1 and 2 and is shown in detail in FIGS. 3 and 5. FIG. 3 is an exploded perspective view of the seat assembly 130, and FIG. 5 is a view in partial section through the seat assembly 130 in its assembled state. For the following discussion of the seat assembly 130, reference will primarily be made to FIGS. 1, 2, 3, and 5.

The seat assembly 130 includes a plate 132 which is appropriately secured, as by welding, to the outer tubing or sleeve 62. The plate 132 includes a pair of downwardly extending flanges, including a flange 134 and a rear flange 136. The flanges 134 and 136 are appropriately notched out to fit or to receive the upper portion of the tube or sleeve 62. This may be best understood from FIG. 5. Incidentally, it will be noted that, for convenience, the outer sleeve 62 only is shown in FIG. 5, and the other elements associated with and disposed within the outer sleeve 62 have been omitted. They have been discussed in detail above and are best shown in FIG. 4.

A housing 140 is in turn disposed on, and appropriately secured to, the plate 132. The housing 140 includes a bottom 142 through which extend a plurality of holes 143, only one of which is shown in FIG. 3. The holes 143 are used to secure the housing 140 to the plate 132. This will be discussed below.

The housing 140 also includes a front wall 144, a back or rear wall 146, and a pair of side walls 148 and 152. A slot 150 extends through the side wall 148, and a slot 154 extends through the side wall 152. The slots 150 and 154 extend downwardly from the upper portions of the side walls 148 and 152, respectively. The slots 150 and 154 are appropriately aligned generally parallel to each other.

A generally rectangular aperture 156 extends through the side wall 152 adjacent to the juncture of the side wall 152 and the back or rear wall 146. The aperture 156 receives appropriate connector elements, not shown, for connecting electrical or electronic components within the housing 140 to game elements, as require, and as are known and are understood.

A control box 170 is disposed within the housing 140. The control box 170 includes a top 172, a front wall 200, a back or rear wall 204, and pair of side walls, including a side wall 208 and a side wall 218. The sides 208 and 218 include outwardly extending flanges. The side 208 includes an outwardly extending flange 212 and the side 218 includes an outwardly extending flange 220.

As best shown in FIG. 3, there are a number of holes or apertures which extend through the top 172 of the control box 170. There are four spring apertures, including a front spring aperture 174, a rear spring aperture 176, and a pair of side spring apertures 178 and 180. The spring apertures 174 . . . 180 are appropriately spaced inwardly from the respective front wall 200, rear wall 204, and the side walls 208 and 218.

A central aperture 182 extends through the top 172 generally centered with respect to the front, rear, and side walls.

A pin aperture 184 also extends through the top wall 172. The pin aperture 184 is shown adjacent to the spring aperture 178.

Four switch or sensor apertures extend through the top wall 172 between the various walls and the spring apertures. There is a switch or sensor aperture 186 between the spring aperture 174 and the front wall 200. There is a switch or sensor aperture 188 which extends between the spring aperture 176 and the rear wall 204. There is a switch or sensor aperture 190 that is disposed between the spring aperture 178 and the side wall 208, and there is a switch or sensor aperture 192 which extends through the top wall 172 between the spring aperture 180 and the side wall 218. Appropriate sensor or switch elements extend upwardly through the switch or sensor apertures, as will be discussed below.

Through the front wall 200, the back or rear wall 204, and the side walls 208 and 218, and adjacent to the switch or sensor apertures, are pairs of holes through which fastening elements, such as screws or bolts, extend to secure switches or sensor elements to the respective four walls. In FIG. 3, there is shown a pair of holes or apertures 202 extending through the front wall 200. Another pair of apertures 210 is shown extending through the side wall 208. Similar pairs of holes or apertures, not shown, extend through the rear wall 204 and the side wall 218.

Four sensor or switch elements are appropriately secured to the four walls of the control box 170. As illustrated, the sensor elements comprise microswitches, each of which includes an arm and an upwardly extending tip on the distal or outer end of the arm. It is the tips of the arms which extend upwardly through the sensor apertures in the top 172 of the control box 170.

In FIG. 3, two microswitches 240 and 260 are shown beneath the front wall 200 and the side wall 208, respectively. In FIG. 5, the microswitch 260 is shown secured to the side wall 208, and two other microswitches, a microswitch 250 and a microswitch 270, are shown secured to the rear wall 204 and the side wall 218, respectively.

The microswitch 240 is shown in FIG. 3 with an arm 242 and a tip 244 extending upwardly from the outer end of the arm. The arm extends outwardly and upwardly from the body of the microswitch. A pair of screws or bolts 246 is shown adjacent to the microswitch 240. The screws or bolts 246 extend through holes in the microswitch and through the holes or apertures 202 to secure the microswitch 240 to the wall 200.

The tip 244 of the arm 242 extends upwardly through the hole or aperture 186.

A pair of conductors 248 is shown extending from the microswitch 240. The conductors 248 extend to an appropriate connector (not shown) disposed in the opening 156 in the wall 152 for appropriate connection to the particular game or device to which the chair apparatus is connected to.

The microswitch 260 as shown in FIG. 3 includes an arm 262 and a tip 264. A pair of screws or bolts 266 is shown adjacent to the microswitch 260. The screws 266 extend through the apertures 210 to secure the microswitch 260 to the wall 208. The tip 264 extends upwardly through the hole or aperture 190.

A pair of conductors 268 is shown extending from the microswitch 260. The conductors 268 also extend to the connector in the opening 156.

The microswitch 250, shown in Phantom in FIG. 3, includes an arm 252 and an arm tip 254. The tip 254 extends upwardly through the aperture 188. The microswitch 250 is secured to the rear wall 204 by a pair of screws or bolts 256. One of the screws 256 is shown in FIG. 5.

The microswitch 270 is secured to the side wall 218 by a pair screws or bolts 276. The microswitch 270 includes an arm 272 and an arm tip 274. The tip 274 of the arm 272 extends upwardly through the hole or aperture 192.

The microswitches 250 and 270 also include conductors, not shown, for connecting the microswitches in the same manner as discussed above in conjunction with the conductors 248 and 268 for the microswitches 240 and 260.

The flange 212 extends outwardly, generally perpendicularly to the side wall 208. The flange 212 is disposed on the bottom 142 of the housing 140. A pair of apertures or holes 214 and 216 extend through the flange 212. A pair of screws or bolts 217 extend through the apertures 214 and 216 and through aligned pairs of apertures or holes in the bottom 142 of the housing 140 and in the plate 132 to secure the control box 170, the housing 140, and the plate 132 together.

The flange 220 is substantially identical to the flange 212, although it is a mirror image thereof. The flange 220 extends outwardly generally perpendicularly to the side 218. The flange 220 is accordingly disposed on the bottom 142 of the housing 140. The flange 220 also includes a pair of holes or apertures through which extend a pair of bolts 226. The bolts 226 extend through aligned apertures in the bottom 142 of the housing 140 and through the plate 132. Washers, nuts, etc., are used to secure the bolts 217 and 226 to the plate 132, as shown in FIG. 5 and as is well known and understood. Thus, by means of the bolts 217 and 226 and their respective washers and nuts, the control box 170 and the housing 140 are secured to the base 12 through the plate 132.

A control plate 300 is disposed above the top 172 of the control box 170. The control plate 300 is preferably a round plate, as best shown in FIG. 6. FIG. 6 is a top view of the control plate 300, showing a portion of an actuator 360 secured thereto. FIG. 7 is a view in partial section through the plate 300 taken generally along line 7—7 of FIG. 6. The control plate 300, and its associated elements, may best be understood from FIGS. 3, 5, 6, and 7. Accordingly, for the following discussion, reference will primarily be made to FIGS. 3, 5, 6, and 7.

The control plate 300 includes a center hole 302. Five threaded studs extend upwardly from the control plate 300. The threaded studs include a stud 304, a stud 306, a stud 308, a stud 310, and a stud 312. The studs 304 and 306 are aligned with each other, and the studs 308 and 310 are aligned with each other. The pairs of studs 304, 306 and 308, 310 are disposed on opposite sides of the stud 312 and the center hole 302, respectively. The stud 312 is aligned with the center hole 302.

A pin 314 extends downwardly from the bottom of the plate 300. When the plate 314 is appropriately secured to the control box 170, the pin 314 extends downwardly through the pin aperture 184 in the top 172. The purpose of the pin 314 is to prevent rotation of the plate 300 relative to the control box 170.

The purpose of the stud pairs 304, 306 and 308, 310 is to secure a joy stick or actuator 360 to the plate 300. The actuator or joy stick 360 includes a bottom portion 362 which is disposed on the top of the plate 300 and between the stud pairs 304, 306 and 308, 310. The bottom portion 362 is secured to the plate 300 by a pair of mounting brackets 400 and 410. The mounting brackets 400 and 410 each include a curved central portion which is disposed over the bottom or horizontal portion 362 of the joy stick 360 and a pair of outwardly extending flanges through which extend apertures. The studs 304 and 306 extend through the apertures in the mounting bracket 400 and a pair of nuts 402 and 404 threadedly engage the studs 304 and 306 to secure the bracket 400 to the plate 300.

The bracket 410 is substantially identical to the bracket 400. Its pair of apertures extend over the studs 308 and 310 and a pair of nuts 412 and 414 are respectively secured to the threaded studs 308 and 310 to also secure the bottom portion 362 of the joy stick 360 to the plate 300.

Extending outwardly from the bottom portion 362 of the joy stick or actuator 360 is a plate 364. The plate 364 is appropriately secured, as by welding, to the bottom 362 at about its mid point. An aperture 366 extends through the plate 364.

The actuator or joy stick 360 is pivotly secured to the plate 300 by the brackets 400 and 410. To secure the actuator or joy stick 360 in its use orientation, as shown in FIGS. 1 and 2, the aperture 366 of the plate 364 extends over the threaded stud 312, and a wing nut 368 threadedly engages the stud 312 above the plate 364 to secure the plate 364, and accordingly the joy stick 360, in the upright or use position or orientation relative to the plate 300.

For storage and transport purposes, the wing nut 368 is removed from the stud 312, and the joy stick or actuator 360 may then be pivoted rearwardly and downwardly until it is generally parallel to the horizontal assembly 60. The pivoting movement of the joy stick 360 is indicated in FIG. 2 by the large curved arrow adjacent to the joy stick.

The actuator or joy stick 360 is made of tubing, and is accordingly hollow. The actuator or joy stick 360 includes two arms, an upwardly extending arm 372 and an upwardly extending arm 382. The arms are appropriately curved, as shown in FIGS. 1 and 2, for convenience in use.

At the top of the arm 372 there is a handle grip 374. The handle grip 374 includes a top switch 376 and a front trigger switch 378. The arm 382 also includes at its top or upper end a handle grip 384. A top switch 386 extends upwardly from the handle grip 384 and a trigger 388 extends outwardly from the handle grip 384.

Appropriate electrical elements are disposed in the handle grips 374 and 384 and are secured to the switches 376, 378 and 386, 388. Such elements are connected by conductors 390 schematically shown in FIG. 6. The elements are appropriately connected to the electrical conductors 390 which extend down through the interior of the actuator or joy stick 360 and extend outwardly through an aperture 370, also shown in FIG. 6.

While only two conductors 390 are illustrated, it will be understood that the tubing of which the actuator or joy stick 360 is composed will accomodate as many conductors as required by the switches or triggers associated with the handlegrips. The electrical conductors 390 then extend to the appropriate connector disposed in the aperture 156 in the housing 140, as previously mentioned.

The plate 300 is secured to the top 172 of the control box 170 by means of a bushing 340, a bolt 342, a washer 344, and a nut 346. The bushing 340 is disposed on the plate 300 about the hole or aperture 302. The bolt 304 extends through the bushing 340, through the hole or aperture 302 in the plate 300 and through the center hole or aperture 182 in the top 172. The washer 344 and the nut 346 are beneath the top 172, and the nut 346 threadedly engages the bottom of the bolt 342. This is shown best in FIG. 5.

While the bolt 342 secures the plate 340 to the control box 170, the bushing 340 allows the plate 300 to move relative to the control box 170, and particularly relative to the microswitches and to the tips at the ends of the actuator arms of the microswitches which extend upwardly from the top 172 to the control box 170. The movement is in response to movement of the arms 372 and 382 of the joy stick 360.

The plate 300 is essentially supported by four springs, and the springs allow the plate 300 to move in response to the movement of the actuator or the joy stick 360. The four springs include a front spring 324, a rear spring 326, and a pair of side springs 328 and 330. The springs 324 . . . 330 are shown in FIG. 3. Two of the springs, the side springs 328 and 330, are shown in FIG. 5. The springs 324 . . . 330 are disposed on the bottom 142 of the housing 140 and extend upwardly through the respective spring apertures 174 . . . 180 in the top 172 of the control box 170.

The springs 324...330 bias the plate 300 to a neutral position out of contact with the tips of the microswitches. The springs also oppose movement of the plate. However, the opposition of the springs is relatively light, but is sufficient to insure that some force is required on the joy stick to move the plate. In other words, the joy stick by itself remains in a neutral position of orientation, and a positive forceful movement applied to the joy stick is required to move the plate into contact with the tips of the microswitches to provide an output signal from the microswitches.

Movement of the plate 300 in response to the movement of the joy stick 360, by movement of the arms 372 and 382, is opposed by the compression springs 324 . . . 330. In the neutral position, as shown in FIG. 5, the plate 300 is spaced apart a slight distance above the tips 244 . . . 274 of the microswitch arms. The bolt 342 essential comprises a pivot point for the plate 300 and forward, backward, and sideways movements on the arms 372 and 382 of the joy stick 360 causes the plate 300 to pivot, and the pivoting movement makes contact with the tips of the microswitches. The contact of the plate with a tip causes the tip to move its arm downwardly, thus providing an output signal from the microswitch. This is well known and understood.

It will be noted that the pivoting movement of the plate 300 may result in contact with either one or two microswitches, as desired. That is, the pivoting movement of the plate 300 will allow contact between the plate and any one of the microswitches, or two of the microswitches at substantially the same time. The contact between two of the microswitches will include either the front and one of the side microswitches or the rear and one of the side microswitches. Both front and rear and both side microswitches can't be actuated at the same time, but the front microswitch and one of the side microswitches, or the rear microswitch and one of the side microswitches may be contacted or actuated at substantially the same time.

It will accordingly be understood that the chair apparatus 10 includes the capability of providing a number of substantially simultaneous signals for the playing of various types of electronic games. The signals include output signals from the microswitches and from the switches on the handle grips. Moreover, it will be understood that additional switches may be included on the handles, such as on the top of the handle and even more trigger switches beneath the top of the handles. Furthermore, as discussed above, additional actuators may be incorporated into the foot rests, if desired. In the alternative, the foot rest assembly 20 may be omitted entirely.

Finally, a seat and cushion 420 is appropriately pivotly secured to the housing 140 by a hinge 422, as shown in FIG. 2. The pivotal securement of the seat and cushion 420 to the housing 140 allows access to the wing nut 368, as discussed above. Thus, for storage purposes, the seat and cushion 420 is pivoted upwardly and the wing nut 368 is removed from the stud 312 to allow the actuator or joy stick 360, and particularly its arms 372 and 382, to be moved backwardly, or towards the seat assembly 110, for storage or transport purposes. After the joy stick 360 is pivoted rearwardly, the wing nut 368 may be again secured to the stud 312. The cushion 420 is then returned to its down position.

The pivoting movement of the seat cushion 420 is shown in FIG. 2 by a large doubled headed arrow.

The back assembly 110 may then be pivoted downwardly until the seat back or cushion 120 is disposed generally on top of the seat cushion 420, again for storage and transport purposes. The pivotal movement of the seat back 120 is also shown in FIG. 2 by a large double headed arrow.

The base 12 may also be collapsed for transport and storage purposes. Rotating the handle 72 to extend the inner tube 78 relative to the fixed, outer tube or sleeve 62 essentially collapses the base 12. The adjustment of the base 12, and the raising and lowering of it, may be understood from the dash/dot positions shown in FIG. 2. Thus, the chair apparatus 10 may be essentially folded into a compact package for transport or storage purposes.

The setting up of the chair apparatus 10 for use by a user or game player is substantially the reverse of that just described. After appropriate electrical connections are made to an electronic game, the user then sits on the seat cushion 420, with the user's back against the seat back or cushion 120, and the user's feet either on the foot rests 28 and 30, or on the floor, as desired. The user then grasps the handle grips 374 and 384, with the user's thumbs and fingers on the appropriate triggers and switch elements. With the user now comfortably and appropriately disposed on the chair apparatus 10, the chair apparatus is ready for use.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Game chair apparatus for use with electronic games, comprising in combination:
   base means for supporting a seat;
   a seat supported by the base means; and
   control box means secured to the base means for supporting switch elements for the electronic games, including
   a movable plate,
   means for supporting the movable plate relative to the seat,
   joy stick means secured to the movable plate for moving the plate in response to a user seated on the seat, and
   switch elements actuable in response to movement of the plate for providing output signals for the electronic games.

2. The apparatus of claim 1 in which the joy stick means includes a first portion secured to the movable plate and a pair of arms secured to the first portion, and the user moves the arms to move the movable plate.

3. The apparatus of claim 2 in which the joy stick means is pivotal relative to the movable plate for storage and transport purposes.

4. The apparatus of claim 1 in which the control box means further includes
   a plate secured to the base means,
   a control box secured to plate and having a top and four walls, and the switch elements are secured to the walls and the movable plate is secured to the top.

5. The apparatus of claim 4 in which the joy stick means includes a pair of arms and a central portion, and the center portion is secured to the movable plate and the arms are secured to the center portion for moving the movable plate.

6. The apparatus of claim 5 in which the control box means further includes a housing secured to the plate and the control box is disposed in the housing, and the seat is pivotally secured to the housing.

7. The apparatus of claim 6 in which the top of the control box of the control box means includes apertures for
   providing communication between the switch elements and the movable plate.

8. The apparatus of claim 7 in which each microswitch includes a portion extending through the apertures in the top of the control box and movement of the movable plate contacts the portions of the microswitches extending through the apertures in the top to provide an output signal in response to the movement of the movable plate.

9. The apparatus of claim 8 in which the control box means further includes compression spring means for biasing the movable plate to a neutral position and in opposition to movement of the joy stick means.

10. The apparatus of claim 1 in which the joy stick means includes handle means gripped by a user for moving the movable plate.

11. The apparatus of claim 10 in which the handle means includes handle switch means for providing output signals.

12. The apparatus of claim 1 in which the base means further includes chair back means.

13. The apparatus of claim 12 in which the chair back means includes a fixed portion and a cushion portion movable relative to the fixed portion between an up position for use and a down position for transport and storage.

14. The apparatus of claim 1 in which the base means includes a front portion, a back portion pivotally secured to the front portion, and a horizontal portion pivotally secured to both the front and back portions, and the control box means is secured to the horizontal portion.

* * * * *